(12) United States Patent
Smith et al.

(10) Patent No.: US 9,273,876 B2
(45) Date of Patent: Mar. 1, 2016

(54) MEMBRANE CONTACTOR FOR DEHUMIDIFICATION SYSTEMS

(71) Applicant: Carrier Corporation, Farmington, CT (US)

(72) Inventors: Kenneth David Smith, East Longmeadow, MA (US); Zidu Ma, Ellington, CT (US); Sherif Kandil, Ellington, CT (US)

(73) Assignee: CARRIER CORPORATION, Farmington, CT (US)

( * ) Notice: Subject to any disclaimer, the term of this patent is extended or adjusted under 35 U.S.C. 154(b) by 0 days.

(21) Appl. No.: 14/157,958

(22) Filed: Jan. 17, 2014

(65) Prior Publication Data

US 2014/0283690 A1   Sep. 25, 2014

Related U.S. Application Data

(60) Provisional application No. 61/803,643, filed on Mar. 20, 2013.

(51) Int. Cl.
| | |
|---|---|
| *B01D 53/22* | (2006.01) |
| *F24F 3/14* | (2006.01) |
| *B01D 53/26* | (2006.01) |

(52) U.S. Cl.
CPC ............... *F24F 3/14* (2013.01); *B01D 53/263* (2013.01); *B01D 53/268* (2013.01); *F24F 3/1411* (2013.01); *B01D 53/227* (2013.01); *B01D 2319/06* (2013.01)

(58) Field of Classification Search
CPC .... B01D 53/22; B01D 53/225; B01D 53/226; B01D 53/227; B01D 53/263; B01D 53/268; B01D 2257/80; B01D 2319/06; F24F 3/14; F24F 3/1411

USPC ............................................ 95/52; 96/7, 9
See application file for complete search history.

(56) References Cited

U.S. PATENT DOCUMENTS

| | | | | |
|---|---|---|---|---|
| 3,735,558 | A * | 5/1973 | Skarstrom et al. | 95/51 |
| 4,900,448 | A * | 2/1990 | Bonne et al. | 95/44 |
| 5,460,004 | A | 10/1995 | Tsimerman | |
| 5,525,143 | A * | 6/1996 | Morgan et al. | 95/52 |
| 5,558,087 | A | 9/1996 | Psaros et al. | |
| 5,653,115 | A | 8/1997 | Brickley et al. | |
| 6,497,107 | B2 | 12/2002 | Maisotsenko et al. | |
| 7,435,284 | B2 | 10/2008 | Piccinini et al. | |

(Continued)

FOREIGN PATENT DOCUMENTS

| | | |
|---|---|---|
| CN | 102165268 A | 8/2011 |
| DE | 102008019829 A1 | 10/2009 |

(Continued)

OTHER PUBLICATIONS

European Search Report for application EP 14151708.6, dated Oct. 10, 2014, 6 pages.

*Primary Examiner* — Jason M Greene
(74) *Attorney, Agent, or Firm* — Cantor Colburn LLP

(57) ABSTRACT

A contactor configured for use in a dehumidification system is provided including a plurality of contact modules. Each contact module has a porous membrane that defines an internal space through which a hygroscopic material flows. A membrane property of the porous membrane of at least one contact module is substantially different than the other membranes of the plurality of contact modules.

18 Claims, 3 Drawing Sheets

(56) References Cited

U.S. PATENT DOCUMENTS

| | | |
|---|---|---|
| 7,758,671 B2 | 7/2010 | Kesten et al. |
| 8,268,060 B2 | 9/2012 | Hargis et al. |
| 2003/0111414 A1* | 6/2003 | Baurmeister et al. ......... 210/641 |
| 2004/0099140 A1* | 5/2004 | Hesse et al. ......................... 96/8 |
| 2006/0081524 A1* | 4/2006 | Sengupta et al. ........ 210/321.88 |
| 2006/0112826 A1 | 6/2006 | Ichigaya |
| 2007/0144727 A1 | 6/2007 | Hirayama et al. |
| 2010/0212501 A1* | 8/2010 | Peters et al. ......................... 96/8 |
| 2010/0224540 A1* | 9/2010 | Rolchigo et al. .............. 210/151 |
| 2010/0319370 A1 | 12/2010 | Kozubal et al. |
| 2011/0174156 A1* | 7/2011 | Saunders et al. ................. 95/46 |
| 2012/0217199 A1* | 8/2012 | Muehlinghaus et al. .. 210/323.1 |
| 2013/0174737 A1* | 7/2013 | Chantereau ....................... 96/10 |
| 2014/0150287 A1* | 6/2014 | Ahn et al. ....................... 34/474 |

FOREIGN PATENT DOCUMENTS

| | | |
|---|---|---|
| DE | 102010050042 A1 | 5/2012 |
| EP | 0013081 A2 | 7/1980 |
| NL | 1032512 C2 | 3/2008 |
| WO | 0179771 A1 | 10/2001 |
| WO | 0244624 A1 | 6/2002 |
| WO | 2011161547 A2 | 12/2011 |

* cited by examiner

MEMBRANE CONTACTOR FOR DEHUMIDIFICATION SYSTEMS

CROSS-REFERENCE TO RELATED APPLICATIONS

This application claims the benefit of U.S. provisional patent application Ser. No. 61/803,643 filed Mar. 20, 2013, the entire contents of which are incorporated herein by reference.

BACKGROUND OF THE INVENTION

This invention was made with Government support under Contract No. DE-AR0000147. The Government has certain rights in the invention.

BACKGROUND OF THE INVENTION

The invention relates generally to contactors, and more particularly, to porous membrane contactors configured for use in a dehumidification system.

Membrane contactors allow a gaseous phase and a liquid phase, to exchange mass and heat between the phases, without dispersing one phase into the other. A common use for a membrane contactor is the removal or dissolution of gases in a liquid. Examples of conventional contactors include packed towers, flat panel membrane contactors, and tubular contactors. In conventional systems, membrane contactors are operated with an aqueous fluid flow adjacent one side of the hydrophobic membrane, and a gas applied to the other side of the membrane. Because the membrane is hydrophobic, the membrane will not allow liquid water to pass through the pores into the gas side of the membrane. By adjusting the vapor pressure of the gas in contact with the membrane, gases, such as water vapor for example, can be selectively removed or dissolved into the liquid.

The effectiveness of a dehumidification system is dependent on the efficiency of the membrane contactor. Several problems exist with conventional contactors. For example, condensation may form on the gas side of the membrane and individual gas and liquid flows cannot be varied independently over wide ranges. In addition, the heat and mass transfer between the liquid and the gas within the contactor occur at different rates, thereby limiting the efficiency of the contactor. If the heat transfer rate is faster than the rate of mass transfer, the temperatures of the hygrospcopic material stream and the air stream will equalize quickly, thereby decaying the mass transfer potential. If the mass transfer rate is faster than the rate of heat transfer, the heat of absorption will diminish the temperature difference between the hygroscopic material stream and the air stream decaying the heat transfer potential. Therefore, to allow for use of porous membrane contactors in dehumidification applications, the membrane contactor design needs to be optimized to balance the heat and mass transfer rates to optimize performance.

BRIEF DESCRIPTION OF THE INVENTION

According to one embodiment of the invention, a contactor configured for use in a dehumidification system is provided including a plurality of contact modules. Each contact module has a porous membrane that defines an internal space through which a hygroscopic material flows. A membrane property of the porous membrane of at least one contact module is substantially different than the other membranes of the plurality of contact modules.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION OF THE INVENTION

Figure 1:
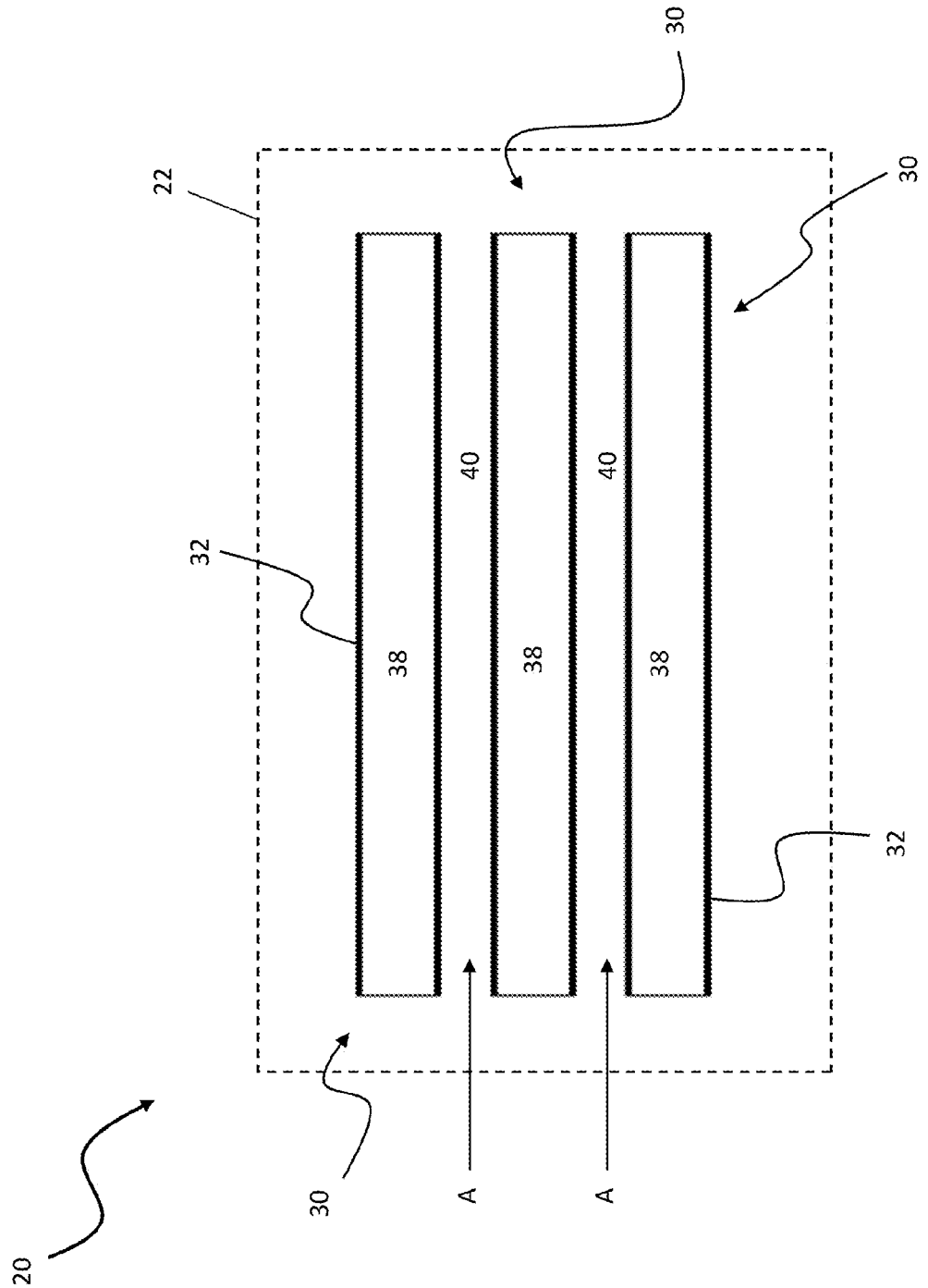
FIG. 1 is a cross-sectional view of an exemplary contactor.
Figure 2:
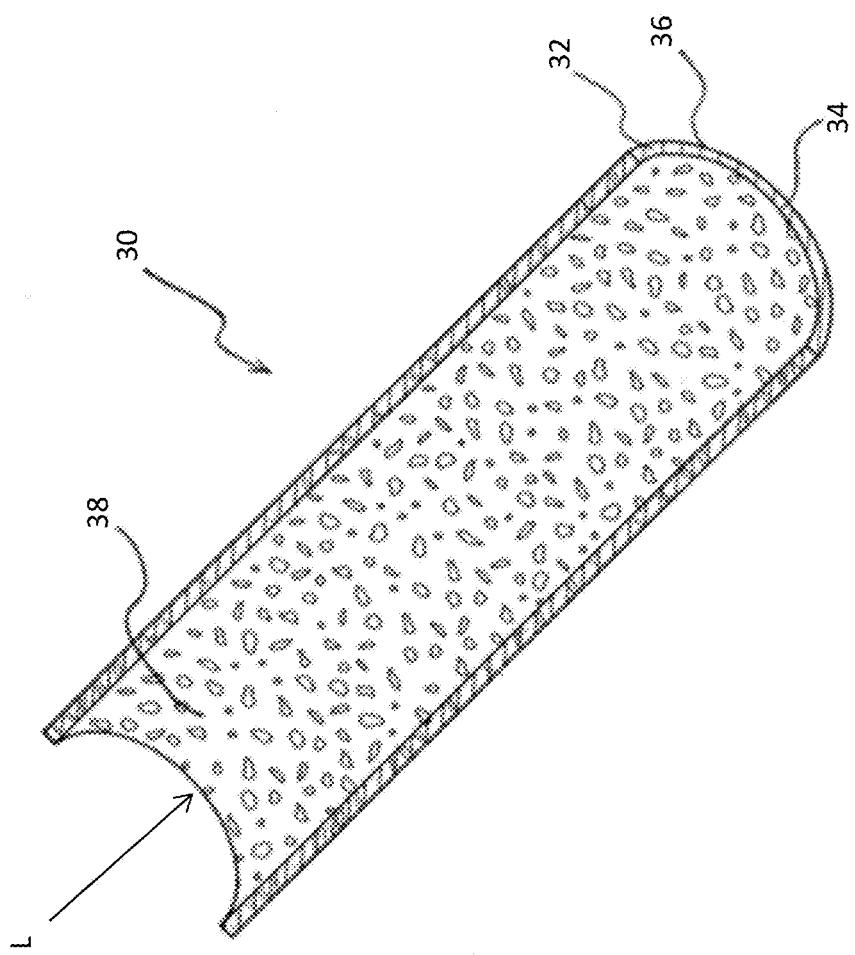
FIG. 2 is a perspective view of a cross-section of a contact module within a contactor.

Referring now to FIG. 1, a cross-section of an exemplary contactor 20, such as a flat panel membrane contactor for example, configured for use in a dehumidification system is illustrated. The schematically illustrated contactor 20 is configured to simultaneously provide heat and/or mass transfer between a hygroscopic material L, such as a liquid desiccant including an aqueous lithium chloride solution for example, and an air flow A, for example outdoor air to be cooled and conditioned prior to being supplied to a building ventilation system. A cross-section of the contactor 20 is shown in simplified form with a housing 22 represented by dashed lines and without inlet ducts, outlet ducts, manifolds, etc. . . . The contactor 20 may include a single contact module 30, or a plurality of similar contact modules 30, for example arranged in a repeating configuration as shown in FIG. 1, such that a channel 40 exists between adjacent contact modules 30. Referring now to FIG. 2, an exemplary cross-section of a contact module 30, such as from a tubular contactor for example, is provided in more detail. The contact modules 30 of FIGS. 1 and 2, are formed with a porous membrane 32 having an interior side 34 and an exterior side 36 (best shown in FIG. 2). The interior side 34 of the membrane 32 defines an internal space or channel 38 through which the hygroscopic material L flows. Though a tubular contact modules 30 is illustrated and described in the disclosed, non-limiting embodiments, contactors that use another known humidity absorbing/desorbing device, such as a flat sheet membrane or a packed tower for example, are within the scope of the invention.

The porous membrane 32 is made of a hydrophobic porous material, such as a plastic porous material for example. Examples of suitable materials for the porous membrane 32 include, but are not limited to, polypropylenes, polyethylenes, poly-sulfones, polyethersulfones, polyetheretherketones, polyimides, polyephenylene sulfides, polytetrafluoroethylenes, polyvinylidene difluorides, and combinations thereof. In one embodiment, the porous membrane 32 comprises thermally-resistant polymeric materials, such as polytetrafluoroethylenes, polyvinylidene difluorides, and combinations thereof. The porous membrane 32 can also be made of any porous material that can be coated with a hydrophobic coating on the surface in contact with the hygroscopic material L.

Air flow A is directed, such as with a blower for example, into the plurality of chambers or channels 40 formed between the exterior sides 36 of the membranes 32 of adjacent contact modules 30. The porous membranes 32 of the contact modules 30 are generally permeable to water molecules in a vapor state, but not to the components of the hygroscopic material L. As a result, the porous membranes 32 facilitate heat and/or mass transfer between the hygroscopic material L and the air flow A adjacent the external side 36 of the porous membrane 32 to provide an air flow A of a desirable temperature and/or humidity.

Figure 3:
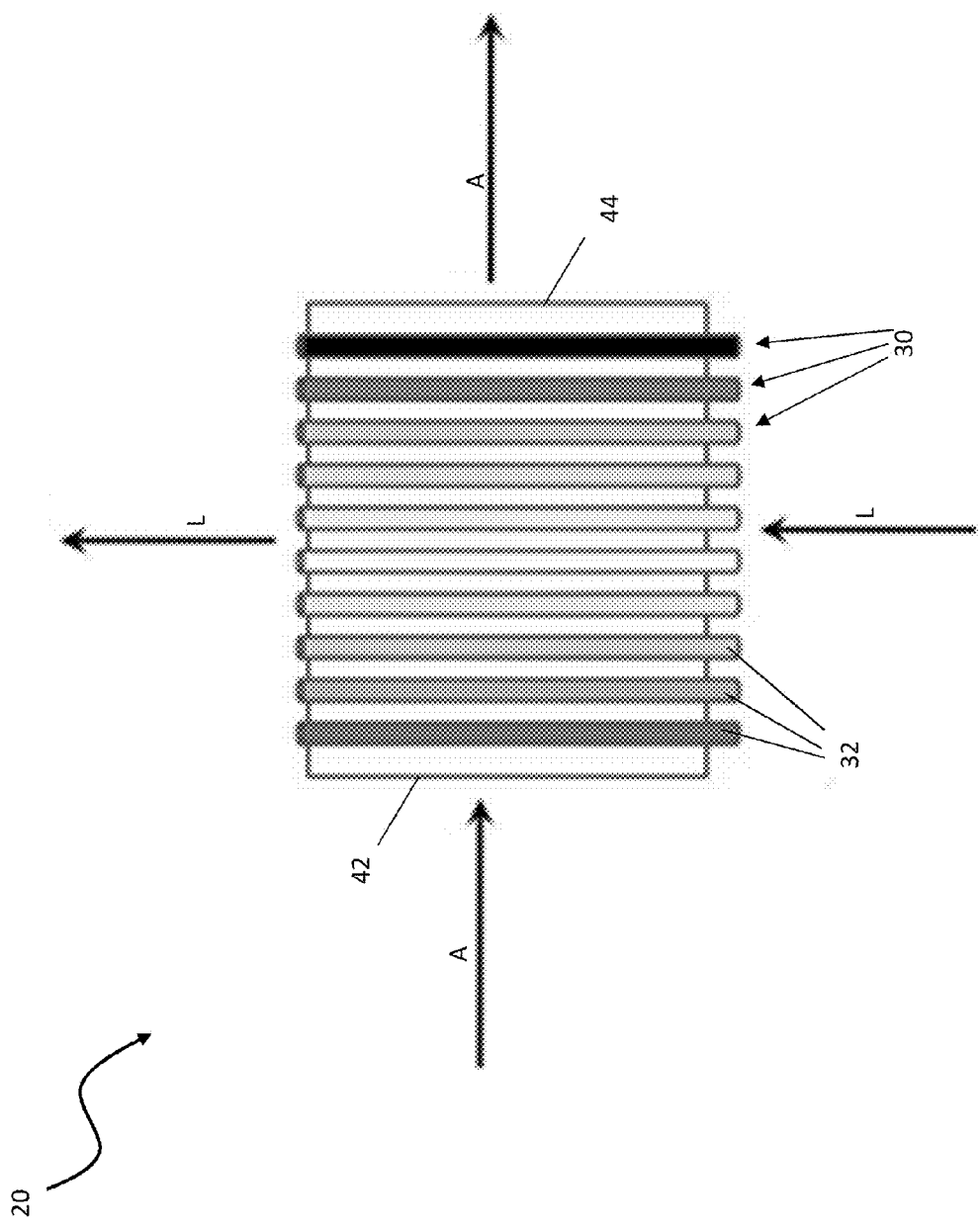
FIG. 3 is a cross-sectional view of a contactor according to an embodiment of the invention.

Referring now to FIG. 3, a cross-section of a tubular membrane contactor configured for use in a dehumidification system is illustrated. A membrane property of the porous membrane 32 of at least one contact module within the contactor may vary from a membrane property of the membranes 32 of the remainder of the plurality of contact modules 30 to balance the heat and/or mass transfer occurring within the contactor 20. Exemplary membrane properties, include, but are not limited to, permeability and thermal conductivity for example. In one embodiment, a membrane property of the porous membrane 32 of each contact module 30 within the contactor 20 may be generally distinct. For example, the permeability of the membrane 32 of adjacent contact modules 30 may vary along a dimension of the contactor 20 or in a direction of the air flow A. In the illustrated non-limiting embodiment, the porous membranes 32 of the plurality of contact modules 30 adjacent the air flow inlet 42 of the contactor 20 are more permeable than the porous membranes 32 of the contact modules 30 adjacent the air flow outlet 44 of the contactor 20. In another embodiment, the thermal conductivity of the porous membranes 32 of the contact modules 30 adjacent the air flow inlet 42 are substantially lower than the thermal conductivity of the porous membranes 32 of the contact modules 30 adjacent the air flow outlet 44 of the contactor 20.

The one or more membrane properties of the membrane 32 of each adjacent contact module 30 may be configured to vary incrementally along the air flow channels 40 of the contactor 20. Though one or more membrane properties of the membranes 32 of adjacent contact modules 30 is illustrated as decreasing along the flow path of air A, embodiments where the one or more membrane properties of the membranes 32 of adjacent contact modules 30 increases along the air flow channels 40, or is random between the inlet 42 and outlet 44 of the air flow channels 40 is within the scope of the invention. For example, the porous membranes 32 of the plurality of contact modules 30 adjacent the air flow inlet 42 of the contactor 20 are less permeable than the porous membranes 32 of the contact modules 30 adjacent the air flow outlet 44 of the contactor 20. Similarly, the thermal conductivity of the porous membranes 32 of the contact modules 30 adjacent the air flow outlet 44 are substantially lower than the thermal conductivity of the porous membranes 32 of the contact modules 30 adjacent the air flow outlet 42 of the contactor 20.

In one embodiment, the membrane 32 of at least one of the plurality of contact modules, such as a contact module 30 adjacent the outlet end 44 of the air flow channels 40 for example, is substantially impermeable, such that no mass transfer occurs between the hygroscopic material L within the contact module 30 and the air flow A. A contact module 30 having an impermeable membrane 32 may be formed from a conventional solid tube or a planar porous membrane that serves only as a heat transfer surface. In another embodiment, the membrane 32 of at least one of the plurality of contact modules 30 may be substantially thermally unconductive, such that no heat transfer occurs between the hygroscopic material L within that contact module 30 and the air flow A.

When contact modules 30 having membranes 32 with a higher permeability or lower thermal conductivity are arranged adjacent the air flow inlet of the contactor 20, the mass transfer between the hygroscopic material L and the air flow A adjacent the inlet is maximized and the heat transfer between the hygroscopic material L and the air flow A is limited. As the air flow A sequentially passes over the contact modules 30 having membranes 32 with incrementally decreasing permeability, or incrementally increasing thermal conductivity, the mass transfer between the hygroscopic material L and the air flow A is slowed generally faster than the heat transfer between the hygroscopic material L and the air flow A. If the airflow A reaches a contact module 30 having an impermeable membrane 32 located adjacent the air flow outlet of the contactor 20, only heat transfer occurs between the air flow A and the hygroscopic material L.

By varying one or more membrane properties of the membranes 32 of the contact modules 30 within the contactor 20, the rates of heat and mass transfer between the hygroscopic material L and the air flow A across the contactor 20 may be better controlled to achieve an desired heat ratio. As a result, the surface area of the membranes 32 may be reduced while maximizing the dehumidication of the air flow A or the regeneration of the hygroscopic material L.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A contactor configured for use in a dehumidification system comprising:
   a plurality of contact modules contained within a single housing of the contactor, each contact module having a porous membrane that defines an internal space through which a hygroscopic material flows, wherein at least one of thermal conductivity and permeability of the porous membrane of at least one contact module is generally distinct from the remainder other membranes of the plurality of contact modules within the contactor.

2. The contactor according to claim 1, wherein the porous membrane is permeable to water vapor and impermeable to the hygroscopic material.

3. The contactor according to claim 1, wherein air is configured to flow through at least one channel formed between an exterior side of the porous membrane of adjacent contact modules.

4. The contactor according to claim 3, wherein the air is configured to flow through the contactor in a single pass or multiple passes.

5. The contactor according to claim 3, wherein the porous membrane of each of the plurality of contact modules has a generally different permeability.

6. The contactor according to claim 5, wherein the permeability of the porous membrane of each of the plurality of contact modules incrementally varies along at least one dimension of the contactor.

7. The contactor according to claim 6, where the permeability of the porous membrane of each of the plurality of contact modules incrementally varies in a direction of the flow of air.

8. The contactor according to claim 7, wherein at least one contact module arranged adjacent an inlet end of the at least one channel has a porous membrane with a high permeability and at least one contact module arranged adjacent an outlet end of the at least one channel has a porous membrane with a low permeability.

9. The contactor according to claim 7, wherein at least one contact module arranged adjacent an inlet end of the at least one channel has a porous membrane with a low permeability and at least one contact module arranged adjacent an outlet end of the at least one channel has a porous membrane with a high permeability.

10. The contactor according to claim 3, wherein the porous membrane of at least one contact module is generally impermeable.

11. The contactor according to claim 10, wherein the at least one contact module having a substantially impermeable porous membrane is arranged adjacent an outlet end of the at least one channel.

12. The contactor according to claim 10, wherein the at least one contact module is formed from a conventional solid tube.

13. The contactor according to claim 10, wherein the at least one contact module is formed from a planar porous membrane.

14. The contactor according to claim 3, wherein the porous membrane of each of the plurality of contact modules has a substantially different thermal conductivity.

15. The contactor according to claim 14, wherein the thermal conductivity of the porous membrane of each of the plurality of contact modules incrementally varies along at least one dimension of the contactor.

16. The contactor according to claim 15, where the thermal conductivity of the porous membrane of each of the plurality of contact modules incrementally varies in a direction of the flow of air.

17. The contactor according to claim 16, wherein at least one contact module arranged adjacent an inlet end of the at least one channel has a porous membrane with a low thermal conductivity and at least one contact module arranged adjacent an outlet end of the at least one channel has a porous membrane with a high thermal conductivity.

18. The contactor according to claim 3, wherein the porous membrane of at least one contact module is substantially thermally unconductive.

\* \* \* \* \*